(12) United States Patent
Chen et al.

(10) Patent No.: US 10,250,550 B2
(45) Date of Patent: Apr. 2, 2019

(54) SOCIAL MESSAGE MONITORING METHOD AND APPARATUS

(71) Applicant: Huawei Technologies Co., Ltd., Shenzhen (CN)

(72) Inventors: Lei Chen, Hong Kong (HK); Xiangmin Zhou, Melbourne (AU); Xiuqiang He, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 341 days.

(21) Appl. No.: 15/147,684

(22) Filed: May 5, 2016

(65) Prior Publication Data

US 2016/0248724 A1 Aug. 25, 2016

Related U.S. Application Data

(63) Continuation of application No. PCT/CN2014/089942, filed on Oct. 30, 2014.

(30) Foreign Application Priority Data

Apr. 28, 2014 (CN) .......................... 2014 1 0175434

(51) Int. Cl.
*G06F 15/16* (2006.01)
*H04L 12/58* (2006.01)
(Continued)

(52) U.S. Cl.
CPC .............. *H04L 51/34* (2013.01); *G06F 17/30* (2013.01); *G06F 17/30705* (2013.01);
(Continued)

(58) Field of Classification Search
CPC ......... H04L 51/34; H04L 51/32; G06N 7/005; G06Q 50/01; G06F 17/30705; G06F 17/30
(Continued)

(56) References Cited

U.S. PATENT DOCUMENTS

| 3,668,647 A | 6/1972 | Evangelisti et al. |
| 2011/0072052 A1* | 3/2011 | Skarin .................... G06Q 10/10 707/794 |

(Continued)

FOREIGN PATENT DOCUMENTS

| CA | 2916110 A1 | 1/2014 |
| CN | 1403957 A | 3/2003 |

(Continued)

OTHER PUBLICATIONS

Partial English Translation and Abstract of Chinese Patent Application No. CN101571853, Jan. 2, 2016, 5 pages.

(Continued)

*Primary Examiner* — Farzana B Huq
(74) *Attorney, Agent, or Firm* — Conley Rose, P.C.

(57) ABSTRACT

A social message monitoring method is implemented by receiving, from a social network server, a social message, and obtaining a theme probability vector of the social message, comparing the theme probability vector of the social message with a theme probability vector of each representative message to obtain a theme similarity, and acquiring a similarity between the social message and each representative message according to the theme similarity, and saving the social message in a message class that contains a representative message most similar to the social message, and outputting the message class to a social network client when a quantity of social messages in the message class reaches a first threshold or themes of social messages in the message class are consistent.

16 Claims, 7 Drawing Sheets

(51) Int. Cl.
*G06F 17/30* (2006.01)
*G06Q 50/00* (2012.01)
*G06N 7/00* (2006.01)

(52) U.S. Cl.
CPC .............. *G06N 7/005* (2013.01); *G06Q 50/01* (2013.01); *H04L 51/32* (2013.01)

(58) Field of Classification Search
USPC ........................................ 709/206, 224, 226
See application file for complete search history.

(56) References Cited

U.S. PATENT DOCUMENTS

| | | | | |
|---|---|---|---|---|
| 2013/0304731 A1* | 11/2013 | Zheng | ................ | G06Q 30/0201 707/728 |
| 2014/0114978 A1* | 4/2014 | Chatterjee | ............ | G06Q 10/107 707/739 |
| 2014/0195543 A1* | 7/2014 | Stefik | ................ | G06F 17/30648 707/741 |
| 2014/0324539 A1 | 10/2014 | Liu et al. | | |
| 2015/0193889 A1* | 7/2015 | Garg | ..................... | G06Q 50/01 705/14.49 |
| 2016/0203523 A1* | 7/2016 | Spasojevic | ......... | G06Q 30/0269 705/14.66 |

FOREIGN PATENT DOCUMENTS

| | | |
|---|---|---|
| CN | 101174273 A | 5/2008 |
| CN | 101571853 A | 11/2009 |
| CN | 101621391 A | 1/2010 |
| CN | 101685464 A | 3/2010 |
| CN | 101710333 A | 5/2010 |
| CN | 101853298 A | 10/2010 |
| CN | 102799625 A | 11/2012 |
| CN | 103177024 A | 6/2013 |
| WO | 2009148646 A2 | 12/2009 |

OTHER PUBLICATIONS

Zhao, Q., et al., "Event Detection and Visualization for Social Text Streams," ICWSM, 2007, 4 pages.
Wan, X., et al., "Link-based Event Detection in Email Communication Networks," SAC, Mar. 8-12, 2009, 5 pages.
Lin, J., et al., "Smoothing Techniques for Adaptive Online Language Models: Topic Tracking in Tweet Streams," KDD, Aug. 21-24, 2011, pp. 422-429.
Zhao, Q., et al., "Temporal and Information Flow Based Event Detection From Social Text Streams," American Association for Artificial Intelligence, 2007, 6 pages.
Yao, J., et al., "Temporal and Social Context based Burst Detection from Folksonomies," Proceedings of the Twenty-Fourth AAAI Conference on Artificial Intelligence, 2010, pp. 1474-1479.
Foreign Communication From a Counterpart Application, European Application No. 14890901.3, Extended European Search Report dated Jul. 5, 2016, 9 pages.
Foreign Communication From a Counterpart Application, PCT Application No. PCT/CN2014/089942, English Translation of International Search Report dated Jan. 21, 2015, 2 pages.
Foreign Communication From a Counterpart Application, PCT Application No. PCT/CN2014/089942, Written Opinion dated Jan. 21, 2015, 4 pages.
Zhou, X., et al. "Event detection over twitter social media streams," VLDB Journal, Jul. 19, 2013, 20 pages.
Machine Translation and Abstract of Chinese Publication No. CN103177024, Jun. 26, 2013, 19 pages.
Foreign Communication From a Counterpart Application, Chinese Application No. 201410175434.5, Chinese Office Action dated Jan. 10, 2018, 8 pages.
Foreign Communication From a Counterpart Application, European Application No. 14890901.3, European Decision dated Jun. 6, 2018, 54 pages.

* cited by examiner

SOCIAL MESSAGE MONITORING METHOD AND APPARATUS

CROSS-REFERENCE TO RELATED APPLICATIONS

This application is a continuation of International Application No. PCT/CN2014/089942, filed on Oct. 30, 2014, which claims priority to Chinese Patent Application No. 201410175434.5, filed on Apr. 28, 2014, both of which are hereby incorporated by reference in their entireties.

TECHNICAL FIELD

The present disclosure relates to the communications field, and in particular, to a social message monitoring method and an apparatus.

BACKGROUND

In recent years, social media, such as microblog, WeChat, forum, and podcast, have become important channels for people to release messages. Information in the social media usually includes various important data and clues about an ongoing event, and timely discovering and monitoring occurrence and development of a major event by means of messages can improve flexibility and real-time performance of management and decision-making on a critical event.

In an example of a flood in Queensland, New Zealand, the entire course of the flood was presented in different angles on Twitter (the name of one of social media) in real time, for example, what happened, where it happened, who was involved, and an influence on a surrounding environment. The following events all appeared on Twitter: "a yacht is sinking in Brisbane River", "the port re-opens", "a shark is washed onto the street", "office areas of some important government organizations are under temporary control", and the like. Timely discovering the foregoing events is of great importance to both disaster relief and crisis management.

An existing social message discovering process is that a user actively searches for a social message and collects related social events using a social network client. That is, to acquire a social message, basic information of the social message needs to be manually input to the social network client manually, and then, a browser or the social network client performs searching to acquire a class of social messages according to the basic information of the social message.

In a process of implementing the foregoing social message discovering, social message acquisition is manually triggered, a social network client cannot implement real-time social message monitoring, and therefore, the social network client cannot actively discover, on the Internet, an update on a social event.

SUMMARY

Embodiments of the present disclosure provide a social message monitoring method and an apparatus, so as to implement real-time social message monitoring, and therefore a social network client can actively discover clustered social events.

The following technical solutions are used in the embodiments of the present disclosure:

According to a first aspect, a social message monitoring method is provided, which includes: receiving a social message, and performing theme modeling analysis on the social message to obtain a theme probability vector of the social message; comparing the theme probability vector of the social message with a theme probability vector of each representative message to obtain a theme similarity, and acquiring a similarity between the social message and each representative message according to the theme similarity, where the representative message is a representative social message in a message class; saving the social message in a message class that contains a representative message most similar to the social message, and outputting the message class to a social network client when a quantity of social messages in the message class reaches a first threshold or themes of social messages in the message class are consistent.

With reference to the first aspect, in a first possible implementation manner, the method further includes: if the similarity between the social message and each representative message is not greater than a preset first similarity threshold, creating a new message class, and saving the social message in the newly created message class.

With reference to the first aspect or the first possible implementation manner of the first aspect, in a second possible implementation manner, the method further includes: selecting the representative message from each message class, where the selecting the representative message from each message class includes: selecting, from each message class, a social message within a preset period of time as the representative message, where preset periods of time in different message classes may be different, or selecting, from each message class, a social message within a preset place as the representative message, where preset places in different message classes may be different, or selecting, from each message class, a social message within a preset period of time and within a preset place as the representative message, where preset periods of time and preset places in different message classes may be different, or performing weighted averaging on theme probability vectors of all social messages in each message class to obtain a theme probability vector of a representative message of each message class, and selecting, from each message class, a social message matching the theme probability vector of the representative message of the message class as the representative message, where if a new social message is added to the message class, the weighted averaging is performed again to calculate the theme probability vector of the representative message of the message class.

With reference to the first aspect or the first or the second possible implementation manner of the first aspect, in a third possible implementation manner, the receiving a social message, and performing theme modeling analysis on the social message to obtain a theme probability vector of the social message includes: receiving the social message, and acquiring a content parameter of the social message, a temporal parameter of the social message, and a spatial parameter of the social message, and performing the theme modeling analysis on the content parameter of the social message, the temporal parameter of the social message, and the spatial parameter of the social message using a latent Dirichlet allocation (LDA) algorithm, to obtain the theme probability vector of the social message.

With reference to the first aspect or any one of the first to the third possible implementation manners of the first aspect, in a fourth possible implementation manner, the method further includes: comparing a user of the social message with a user of each representative message to obtain a user similarity between the social message and each representative message, and the comparing the theme probability vector of the social message with a theme probability vector of each representative message to obtain a theme similarity, and acquiring a similarity between the social message and each representative message according to the theme similarity further includes: calculating a relative entropy between the theme probability vector of the social message and the theme probability vector of each representative message to obtain a theme message similarity between the social message and each representative message, and performing weighted summation on the theme message similarity and the user similarity to obtain the similarity between the social message and each representative message.

With reference to the first aspect or any one of the first to the fourth possible implementation manners of the first aspect, in a fifth possible implementation manner, the method further includes: performing a search, insert, or delete operation on a social message in any message class.

With reference to the first aspect or any one of the first to the fifth possible implementation manners of the first aspect, in a sixth possible implementation manner, before the performing theme modeling analysis on the social message to obtain a theme probability vector of the social message, the method further includes: acquiring a field to which the social message belongs, and if the field to which the social message belongs is not a preset field, removing the social message to obtain a filtered social message, where the performing theme modeling analysis on the social message to obtain a theme probability vector of the social message includes: performing the theme modeling analysis on the filtered social message to obtain the theme probability vector of the social message.

According to a second aspect, a social network server is provided configured to monitor a social message, including: a theme modeling module configured to receive the social message, and perform theme modeling analysis on the social message to obtain a theme probability vector of the social message; a similarity acquisition module configured to compare the theme probability vector of the social message received by the theme modeling module with a theme probability vector of each representative message to obtain a theme similarity between the social message and each representative message, and acquire a similarity between the social message and each representative message according to the theme similarity, where the representative message is a representative social message in a message class; a clustering module configured to save the social message in a message class that contains a representative message most similar to the social message, where the similarity is obtained by means of measurement by the similarity acquisition module; and a clustering analysis module configured to output the message class to a social network client when a quantity of social messages in the message class reaches a first threshold or themes of social messages in the message class are consistent.

With reference to the second aspect, in a first possible implementation manner, the clustering module is further configured to: if the similarity between the social message and each representative message is not greater than a preset first similarity threshold, create a new message class, and save the social message in the newly created message class.

With reference to the second aspect or the first possible implementation manner of the second aspect, in a second possible implementation manner, the social network server further includes: a clustering operation module configured to select the representative message from each message class; where the clustering operation module is further configured to: select, from each message class, a social message within a preset period of time as the representative message, where preset periods of time in different message classes may be different; or select, from each message class, a social message within a preset place as the representative message, where preset places in different message classes may be different; or select, from each message class, a social message within a preset period of time and within a preset place as the representative message, where preset periods of time and preset places in different message classes may be different; or perform weighted averaging on theme probability vectors of all social messages in each message class to obtain a theme probability vector of a representative message of each message class, and select, from each message class, a social message matching the theme probability vector of the representative message of the message class as the representative message, where if a new social message is added to the message class, the weighted averaging is performed again to calculate the theme probability vector of the representative message of the message class.

With reference to the second aspect or the first or the second possible implementation manner of the second aspect, in a third possible implementation manner, the theme modeling module includes: a parameter collecting unit configured to receive the social message, and acquire a content parameter of the social message, a temporal parameter of the social message, and a spatial parameter of the social message; and a vector acquisition unit configured to perform the theme modeling analysis on the content parameter of the social message, the temporal parameter of the social message, and the spatial parameter of the social message using a LDA algorithm, to obtain the theme probability vector of the social message, where the content parameter, the temporal parameter, and the spatial parameter are acquired by the parameter collecting unit.

With reference to the second aspect or any one of the first to the third possible implementation manners of the second aspect, in a fourth possible implementation manner, the social network server further includes: a user similarity measurement module configured to compare a user of the social message with a user of each representative message to obtain a user similarity between the social message and each representative message; and the similarity acquisition module includes: a theme similarity measurement unit configured to calculate a relative entropy between the theme probability vector of the social message and the theme probability vector of each representative message to obtain a theme message similarity between the social message and each representative message; and a similarity acquisition unit configured to perform weighted summation on the theme message similarity obtained by the theme similarity measurement unit and the user similarity obtained by the user similarity measurement module, to obtain the similarity between the social message and each representative message.

With reference to the second aspect or any one of the first to the fourth possible implementation manners of the second aspect, in a fifth possible implementation manner, the clustering operation module is further configured to: perform a search, insert, or delete operation on a social message in any message class.

With reference to the second aspect or any one of the first to the fifth possible implementation manners of the second aspect, in a sixth possible implementation manner, the social network server further includes: a filtering module configured to acquire a field to which the social message belongs, and if the field to which the social message belongs is not a preset field, remove the social message to obtain a filtered social message; where the theme modeling module is further configured to: perform the theme modeling analysis on the filtered social message to obtain the theme probability vector of the social message.

In the foregoing solutions, a social network server receives a social message, and saves, according to a similarity between the social message and each representative message, the social message in a message class that contains a representative message most similar to the social message; and outputs the message class to a social network client when a quantity of social messages in the message class reaches a first threshold or themes of the social messages in the message class are consistent. The social network server can actively output the message class to the social network client, thereby implementing real-time social message monitoring, so that the social network client can actively discover clustered social events.

DESCRIPTION OF EMBODIMENTS

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

Figure 1:
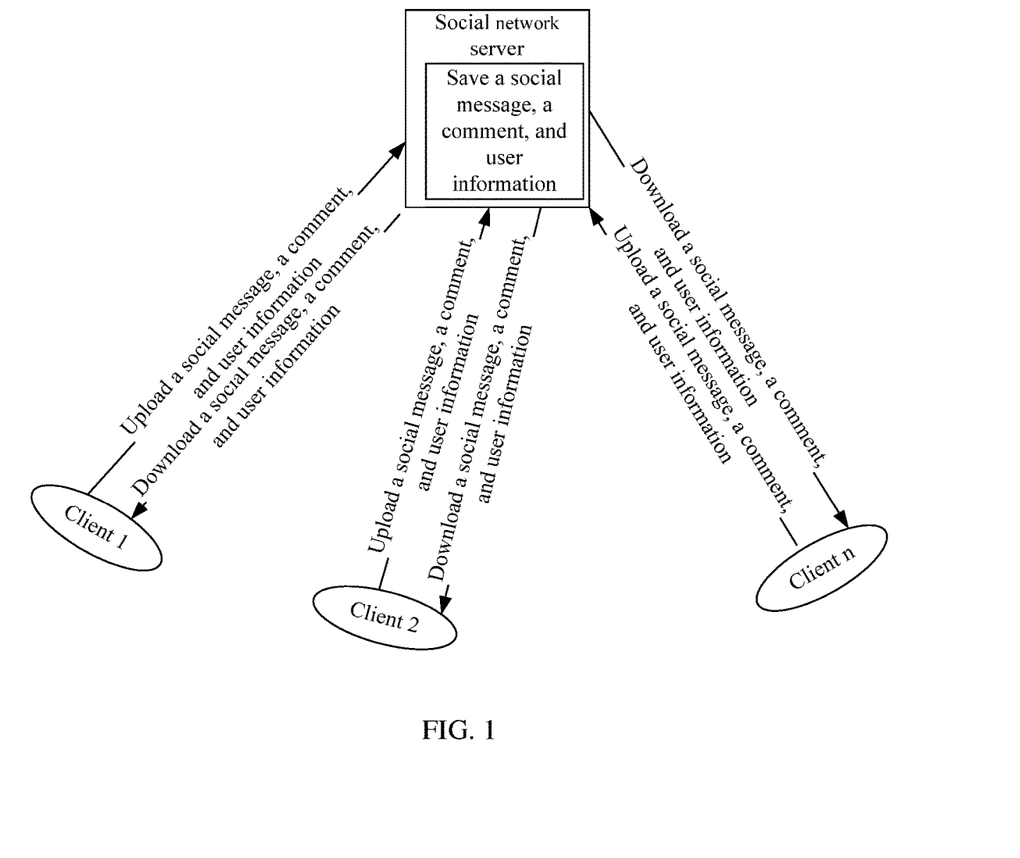
FIG. 1 is a schematic diagram of an application scenario according to an embodiment of the present disclosure.

An embodiment of the present disclosure is applied to a social network system. Referring to FIG. 1, a user uploads a social message (for example, a microblog message) to a social network server using a social network client; if the user needs to browse or comment on an uploaded message, the user sends a request for browsing or commenting on the uploaded social message to the social network server using the social network client. The social network server processes a browsing or commenting service provided by the client, delivers a corresponding social message or comment, and saves a corresponding comment, thereby implementing interaction between users. In this embodiment of the present disclosure, the user uploads the social message to the social network server using the social network client. The social network server performs theme modeling analysis on the uploaded social message, and saves, according to the similarity between the social message and each representative message, the social message in a message class that contains a representative message most similar to the social message. If none of the similarities between the social message and all representative messages is greater than a preset threshold, creates a new message class for the social message, and outputs the message class to the social network client when a quantity of social messages in the message class reaches a first threshold or themes of the social messages in the message class are consistent. In this way, real-time social message monitoring is implemented, enabling the social message to draw attention from the user in a timely manner.

Figure 2:
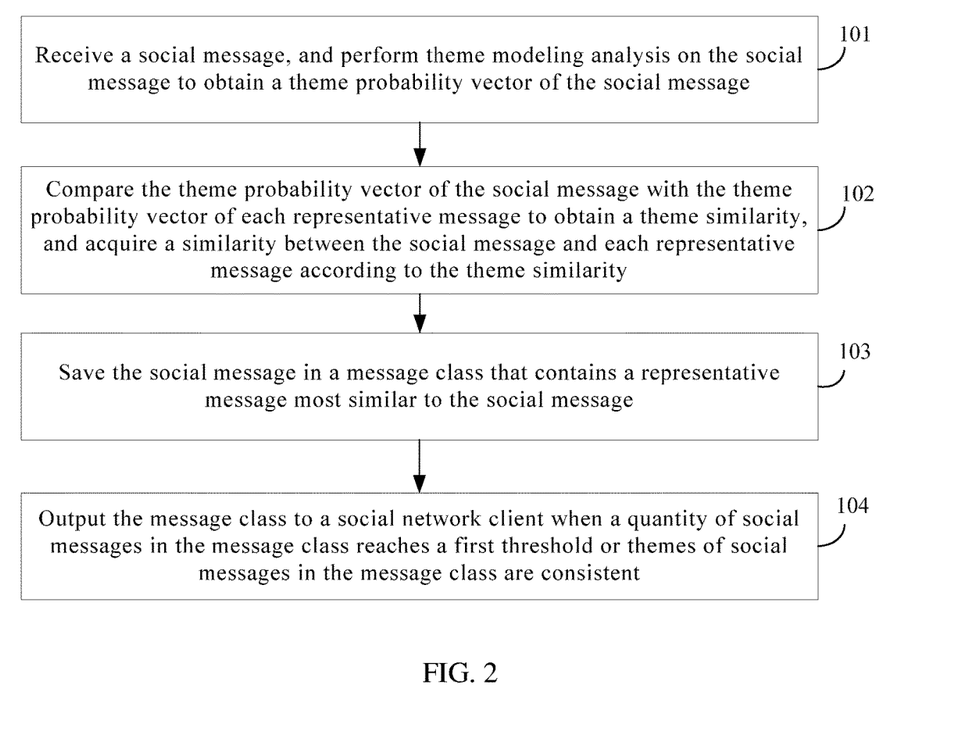
FIG. 2 is a schematic flowchart of a social message monitoring method according to an embodiment of the present disclosure.

Furthermore, referring to FIG. 2, the following steps are included:

Step 101: Receive a social message, and perform theme modeling analysis on the social message to obtain a theme probability vector of the social message.

For each social message received by a social network server, theme modeling analysis is first performed to obtain a theme probability vector of the social message, and there is always a mapping between the theme probability vector of the social message and the social message. The theme probability vector is a vector including probabilities that the social message belong to all themes. For example, the server includes four themes: military affairs, finance and economics, disaster, and entertainment. One social message is received, the theme modeling analysis is performed on the social message, and an obtained theme probability vector includes four probabilities (it is assumed that the theme probability vector is $\{0.2, 0.1, 0.8, 0.3\}$), where the four probabilities are respectively corresponding to a probability of belonging to the theme of military affairs, a probability of belonging to the theme of finance and economics, a probability of belonging to the theme of disaster, and a probability of belonging to the theme of entertainment.

Step 102: Compare the theme probability vector of the social message with a theme probability vector of each representative message to obtain a theme similarity, and acquire a similarity between the social message and each representative message according to the theme similarity, where the representative message is a representative social message in a message class.

After the theme similarity is obtained, a more precise similarity between the social message and each representative message may be further obtained with reference to another similarity parameter.

Step 103: Save the social message in a message class that contains a representative message most similar to the social message.

Optionally, if the similarity between the social message and each representative message is not greater than a preset first similarity threshold, a new message class is created, and the social message is saved in the newly created message class.

The highest similarity is selected from the obtained similarities between the social message and the representative messages. The social message is saved in the message class that contains the representative message corresponding to a similarity with a largest value. If the highest similarity between the social message and the representative message is not greater than the preset first similarity threshold, it indicates that the social message does not belong to any existing message class. Therefore, the new message class is created, and the social message is saved in the newly created message class.

Step 104: Output the message class to a social network client when a quantity of social messages in the message class reaches a first threshold or themes of social messages in the message class are consistent.

When a quantity of social messages in any message class reaches the first threshold, it indicates that the quantity of social messages in the message class is sufficient, and a first condition of outputting is met.

Alternatively, in similarities between all the social messages in the message class, when a quantity of similarities, which are greater than a preset second similarity threshold, between the social messages reaches a second threshold, a condition of theme consistency is met, and the message class is output. The second threshold may also be a proportion, that is, when the quantity of similarities, which are greater than the preset second similarity threshold, between the social messages reaches a proportion of a total quantity, the theme consistency is met.

Optionally, before the theme modeling analysis is performed on the social message, a field to which the social message belongs may be further acquired, and if the field to which the social message belongs is not a preset field, the social message is removed, and a filtered social message is obtained. The social network server may perform the theme modeling analysis on the filtered social message to obtain the theme probability vector of the social message.

For example, the preset field includes: politics, social hotspots, disaster, and finance. If a field to which a received social message belongs is entertainment, the social message is filtered out.

Optionally, a search, insert, or delete operation may be further performed on a social message in any message class.

An operator may perform a search, insert, or delete operation on a social message saved in the social network server using the social network server. In this way, a method for manually inputting and outputting a social message or deleting a social message is provided, resulting in more flexible social message monitoring.

In the foregoing embodiment, a social network server receives a social message, and saves, according to a similarity between the social message and each representative message, the social message in a message class that contains a representative message most similar to the social message, and outputs the message class to a social network client when a quantity of social messages in the message class reaches a first threshold or themes of the social messages in the message class are consistent. The social network server can actively output the message class to the social network client, thereby implementing real-time social message monitoring, so that the social network client can actively discover clustered social events.

Figure 3:
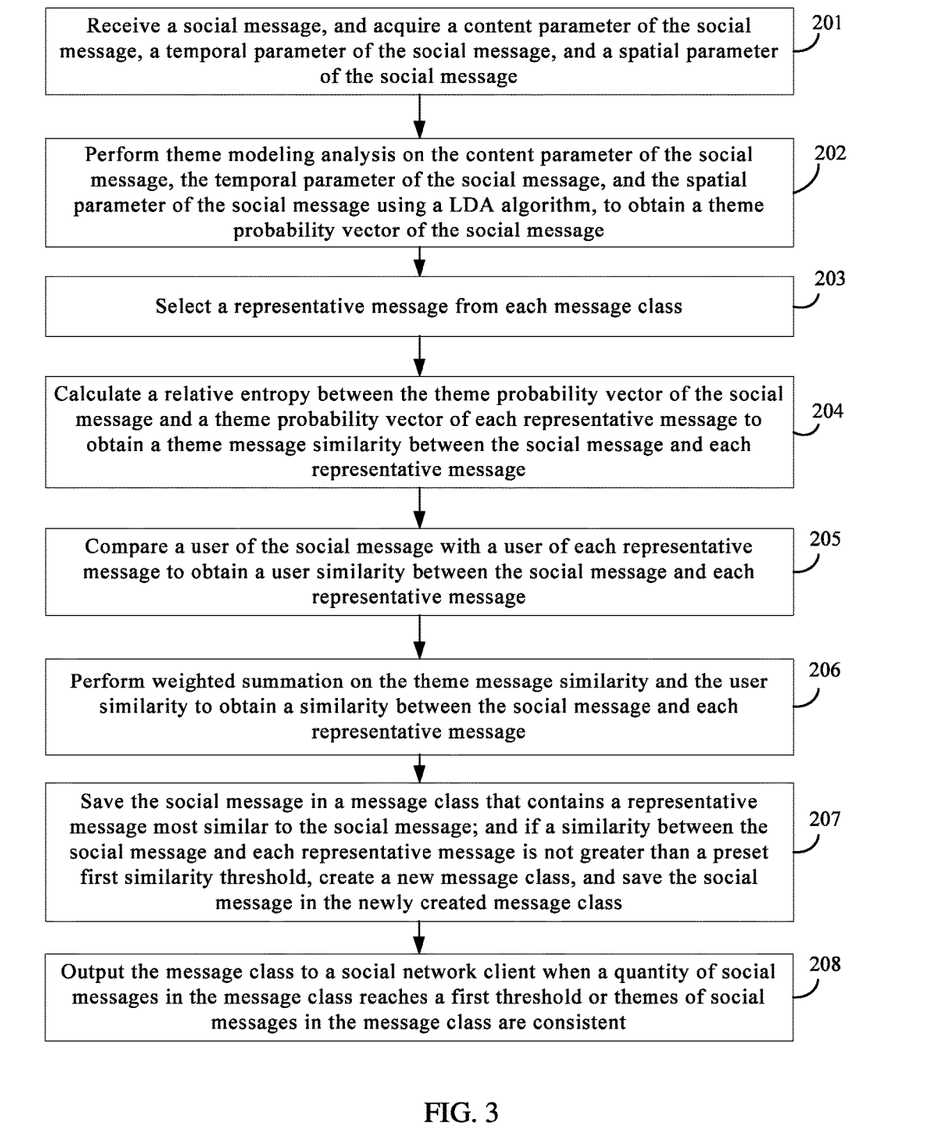
FIG. 3 is a schematic flowchart of a social message monitoring method according to another embodiment of the present disclosure.

An embodiment of the present disclosure provides a social message monitoring method, and referring to FIG. 3, the method includes the following steps:

Step 201: Receive a social message, and acquire a content parameter of the social message, a temporal parameter of the social message, and a spatial parameter of the social message.

Step 202: Perform theme modeling analysis on the content parameter of the social message, the temporal parameter of the social message, and the spatial parameter of the social message using a LDA algorithm, to obtain a theme probability vector of the social message.

The LDA algorithm may be used to perform modeling on the social message. A quantity of themes needs to be first specified, and then the theme probability vector of the social message is obtained by means of calculation according to the LDA algorithm. The theme probability vector includes a probability that the social message belongs to each theme. Precision of modeling is low when only the content parameter of the social message is used, and therefore, the temporal parameter of the social message and the spatial parameter of the social message are further introduced to improve the precision. The introduced temporal parameter of the social message and the introduced spatial parameter (the spatial parameter is classified into: a longitude parameter and a latitude parameter) of the social message may be set as a theme-based beta distribution, so as to calculate the theme probability vector of the social message.

Step 203: Select a representative message from each message class.

Furthermore, the following provides four selecting manners:

A social message within a preset period of time is selected from each message class as the representative message, where preset periods of time in different message classes may be different.

Alternatively, a social message within a preset place is selected from each message class as the representative message, where preset places in different message classes may be different.

Alternatively, a social message within a preset period of time and within a preset place is selected from each message class as the representative message, where preset periods of time and preset places in different message classes may be different.

Alternatively, weighted averaging is performed on theme probability vectors of all social messages in each message class to obtain a theme probability vector of a representative message of each message class, and a social message matching the theme probability vector of the representative message of each message class is selected from the message class as the representative message, where if a new social message is added to the message class, the weighted averaging is performed again to calculate the theme probability vector of the representative message of the message class. A weight of the weighted averaging may be determined according to time, space, and a quantity of users, for example, a more recently uploaded social message has a larger weight, a social message closer to a place of occurrence has a larger weight, and a social message with a larger user quantity (including a quantity of uploading users, a quantity of forwarding users, and a quantity of following users) has a larger weight.

Step 204: Calculate a relative entropy between the theme probability vector of the social message and a theme probability vector of each representative message to obtain a theme message similarity between the social message and each representative message.

A quantity of themes is n, and a calculation formula of a relative entropy between a theme probability vector P(1, 2, . . . , n) of a social message P and a theme probability vector Q(1, 2, . . . , n) of a representative message Q is:

$$D_{KL}(P\|Q) = \sum_i P(i) \log \frac{P(i)}{Q(i)},$$

where $D_{KL}(P||Q)$ represents the relative entropy (Kullback-Leibler divergence, represented by $D_{KL}$) between P and Q, P(i) is the i-th item in the theme probability vector P(1, 2, ..., n) of the social message P, and Q(i) is the i-th item in the theme probability vector Q(1, 2, ..., n) of the representative message Q.

Step 205: Compare a user of the social message with a user of each representative message to obtain a user similarity between the social message and each representative message.

A user of the social message P is: P=<p1, p2, ..., pi>, where p1, p2, ..., pi are all users (uploading users, forwarding users, and replying users) of the social message P, and a user of the representative message Q is: Q=<q1, q2, ..., qn>, where q1, q2, ..., qn are all users of the representative message Q. A calculation formula of the user similarity between the social message and the representative message is:

$$LCS(P, Q) = \begin{cases} 0 \ldots i = 0; j = 0 \\ LCS(P_{i-1}, Q_{j-i}) + 1 \ldots p_i = q_j \\ \max\{LCS(P_i, Q_{j-i}), LCS(P_{i-1}, Q_j)\} \ldots p_i \neq q_j \end{cases},$$

where LCS(P,Q) is a longest common substring (LCS) between the social message P and the representative message Q, and the LCS is a longest common user string. If i=0 or j=0, the social message P or the representative message Q has no user, and therefore, the user similarity is 0. If $p_i = q_j^{p_i = q_j}$, the last user of the social message P and the last user of the representative message Q are same, and the user similarity is a longest common user string plus 1 (the same last user), where the longest common user string is between first (i−1) users of the social message P and first (j−1) users of the representative message Q. If $p_i \neq q_j$, the last user of the social message P and the last user of the representative message Q are not the same, and the user similarity is a larger value of a longest common user string that is between users of the social message P and first (j−1) users of the representative message Q and a longest common user string that is between first (i−1) users of the social message P and users of the representative message Q.

Step 206: Perform weighted summation on the theme message similarity and the user similarity to obtain a similarity between the social message and each representative message.

A formula of a similarity between the social message P and the representative message Q is:

$$D(P,Q) = \omega D_{KL}(P||Q) + (1-\omega)LCS(P,Q),$$

Where D(P,Q) is a similarity between the social message P and the representative message Q, ω is a weight of a theme similarity between the social message P and the representative message Q, and 1−ω is a weight of a user similarity between the social message P and the representative message Q.

Step 207: Save the social message in a message class that contains a representative message most similar to the social message; and if a similarity between the social message and each representative message is not greater than a preset first similarity threshold, create a new message class, and save the social message in the newly created message class.

Figure 4:
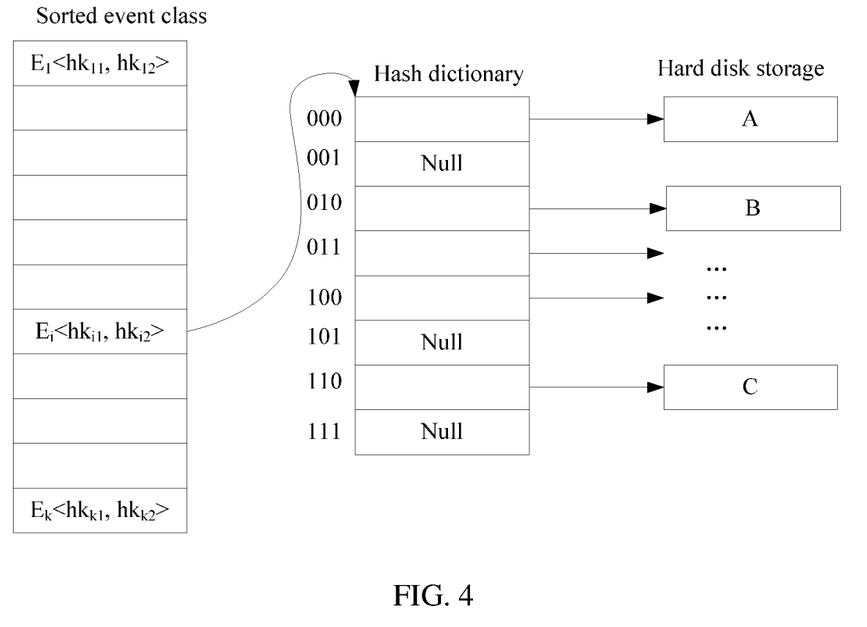
FIG. 4 is a schematic diagram of a social message storage structure according to an embodiment of the present disclosure.

The social message may be saved based on a hash data structure. Referring to FIG. 4, a "sorted event class" saves a hash address of each message class (in FIG. 4, a message class is represented by E, the first message class is $E_1$, the second message class is $E_2$, ..., and the i-th message class is $E_i$; and social messages in the message class $E_i$ are represented by $hk_{i1}$, $hk_{i2}$, ..., and $hk_{im}$), and a "hash dictionary" points to a hard disk storage block that saves social messages. An address of a representative message in a message class is saved in an information of attribute of the message class, and the message class supports rapid indexing and search. The hash data structure supports dynamic storage and delete of social messages. Because a data volume of the social messages is extremely large, the hash data structure saves only social messages in a recent period of time, for example, one hour.

Step 208: Output the message class when a quantity of social messages in the message class reaches a first threshold or themes of social messages in the message class are consistent.

Furthermore, refer to step 104 of FIG. 2, and details are not repeated herein.

Optionally, a search, insert, or delete operation may be further performed on a social message in any message class.

Figure 5:
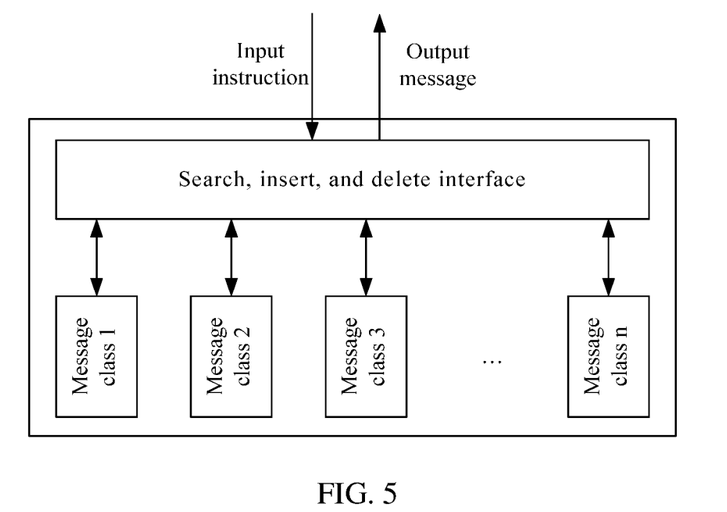
FIG. 5 is a schematic diagram of a search, insert, and delete interface for a social message according to an embodiment of the present disclosure.

Referring to FIG. 5, a search, insert, and delete interface connected to all message classes is provided, and configured to perform the search, insert, or delete operation on the social message. An input instruction (a search, insert, or delete instruction) is received, a response is made to the instruction, and the search, insert, or delete operation is performed on a social message in a corresponding message class. If the input instruction is the search instruction, a corresponding social message is output. If the input instruction is the insert instruction, a social message is inserted into a corresponding message class, and if the input instruction is the delete instruction, a corresponding message class is deleted or a social message specified by the instruction is deleted from a corresponding message class.

In this way, a method for manually inputting and outputting a social message is provided, resulting in more flexible social message monitoring.

In the foregoing embodiment, a social network server receives a social message, and saves, according to a similarity between the social message and each representative message, the social message in a message class that contains a representative message most similar to the social message, and outputs the message class to a social network client when a quantity of social messages in the message class reaches a first threshold or themes of the social messages in the message class are consistent. The social network server can actively output the message class to the social network client, thereby implementing real-time social message monitoring, so that the social network client can actively discover clustered social events.

Figure 6:
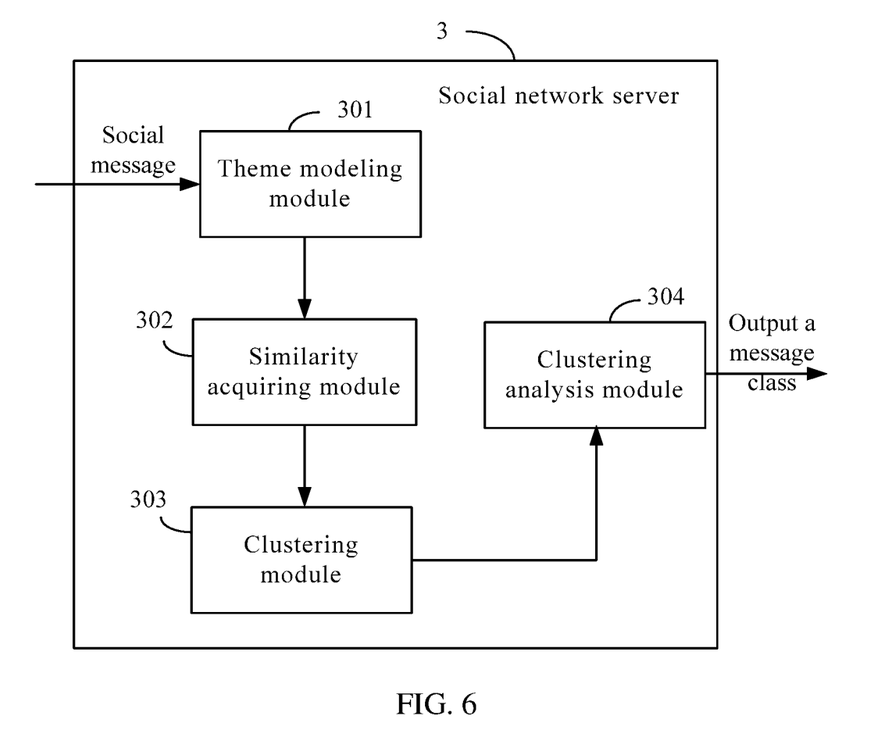
FIG. 6 is a schematic structural diagram of a social network server according to an embodiment of the present disclosure.

An embodiment of the present disclosure provides a social network server 3 configured to monitor a social message, and referring to FIG. 6, the server includes: a theme modeling module 301 configured to receive the social message, and perform theme modeling analysis on the social message to obtain a theme probability vector of the social message.

For each received social message, the theme modeling analysis is first performed to obtain a theme probability vector of the social message, and there is always a mapping between the theme probability vector of the social message and the social message.

Figure 7:
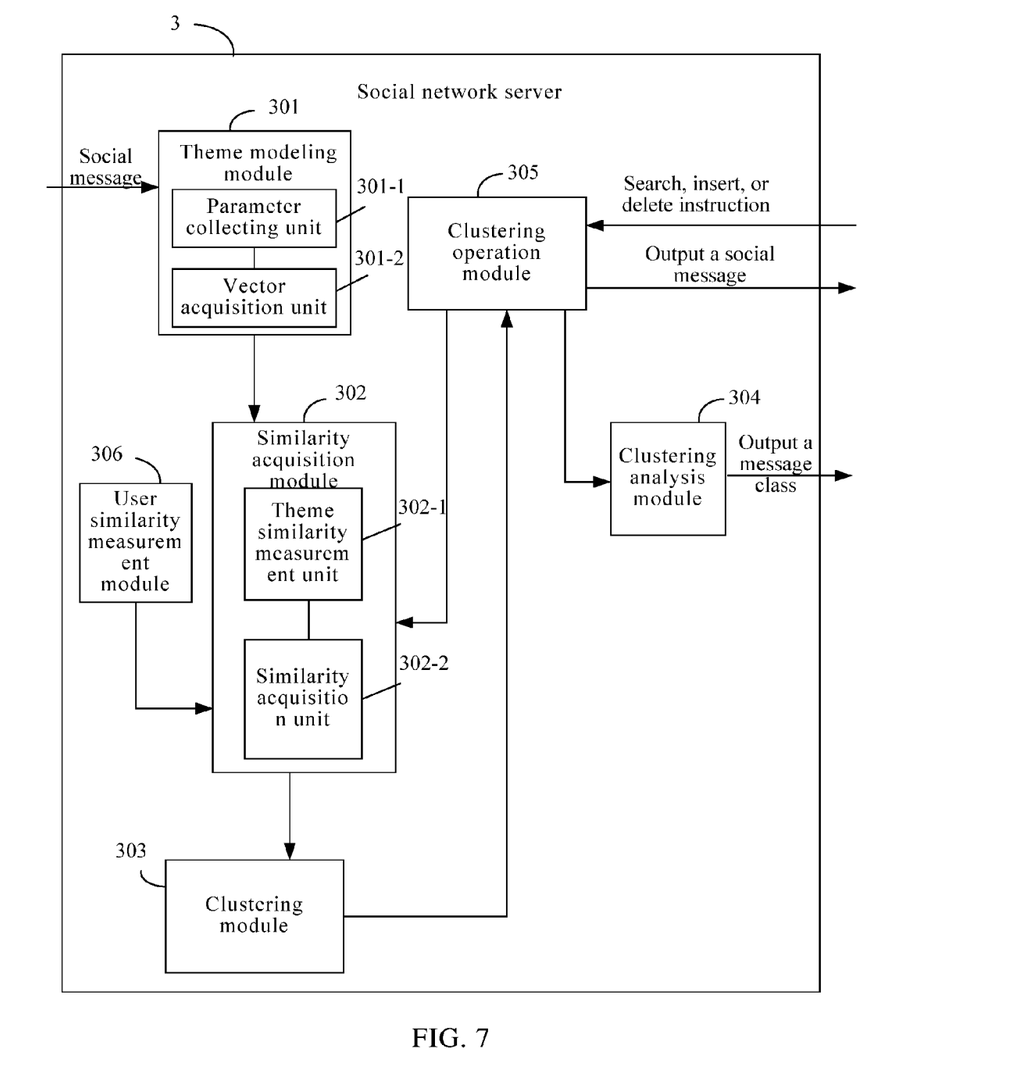
FIG. 7 is a schematic structural diagram of a social network server according to another embodiment of the present disclosure.

Optionally, referring to FIG. 7, the theme modeling module 301 includes: a parameter collecting unit 301-1 configured to receive the social message, and acquire a content parameter of the social message, a temporal parameter of the social message, and a spatial parameter of the social message, and a vector acquisition unit 301-2 configured to perform theme modeling analysis on the content parameter of the social message, the temporal parameter of the social message, and the spatial parameter of the social message using a LDA algorithm, to obtain a theme probability vector of the social message.

Further, the social network server 3 includes: a similarity acquisition module 302 configured to compare the theme probability vector of the social message received by the theme modeling module with a theme probability vector of each representative message to obtain a theme similarity, and acquire a similarity between the social message and each representative message according to the theme similarity.

The representative message is a representative social message in a message class. After the theme similarity is obtained, a more precise similarity between the social message and each representative message may be further obtained with reference to another similarity parameter.

The social network server 3 further includes: a clustering module 303 configured to save the social message in a message class that contains a representative message most similar to the social message, and if the similarity between the social message and each representative message is not greater than a preset first similarity threshold, create a new message class, and save the social message in the newly created message class, and a clustering analysis module 304 configured to output the message class to a social network client when a quantity of social messages in the message class reaches a first threshold or themes of social messages in the message class are consistent.

When a quantity of social messages in any message class reaches a first threshold, it indicates that the quantity of social messages in the message class is sufficient, and a first condition of outputting is met.

Alternatively, in similarities between all the social messages in the message class, when a quantity of similarities, which are greater than a preset second similarity threshold, between the social messages reaches a second threshold, a condition of theme consistency is met, and the message class is output. The second threshold may also be a proportion, that is, when the quantity of similarities, which are greater than the preset second similarity threshold, between the social messages reaches a certain proportion of a total quantity, the theme consistency is met.

Optionally, referring to FIG. 7, the social network server 3 further includes: a clustering operation module 305 configured to select a representative message from each message class.

The representative message is a representative social message in a message class. The clustering operation module 305 saves the message class.

The clustering operation module 305 is further configured to: select, from each message class, a social message within a preset period of time as the representative message, where preset periods of time in different message classes may be different, or select, from each message class, a social message within a preset place as the representative message, where preset places in different message classes may be different, or select, from each message class, a social message within a preset period of time and within a preset place as the representative message, where preset periods of time and preset places in different message classes may be different, or perform weighted averaging on theme probability vectors of all social messages in each message class to obtain a theme probability vector of a representative message of each message class, and select, from each message class, a social message matching the theme probability vector of the representative message of the message class as the representative message, where if a new social message is added to the message class, the weighted averaging is performed again to calculate the theme probability vector of the representative message of the message class. A weight of the weighted averaging may be determined according to time, space, and a quantity of users, for example, a more recently uploaded social message has a larger weight, a social message closer to a place of occurrence has a larger weight, and a social message with a larger user quantity (including a quantity of uploading users, a quantity of forwarding users, and a quantity of following users) has a larger weight.

Optionally, the clustering operation module 305 is further configured to perform a search, insert, or delete operation on a social message in any message class.

An operator may perform a search, insert, or delete operation on a social message saved in the social network server. In this way, a method for manually inputting and outputting a social message or deleting a social message is provided, resulting in more flexible social message monitoring.

Furthermore, an input instruction (a search, insert, or delete instruction) is received, a response is made to the instruction, and the search, insert, or delete operation is performed on a social message in a corresponding message class. If the input instruction is the search instruction, a corresponding social message is output; if the input instruction is the insert instruction, a social message is inserted into a corresponding message class, and if the input instruction is the delete instruction, a corresponding message class is deleted or a social message specified by the instruction is deleted from a corresponding message class.

Optionally, in FIG. 7, the social network server 3 further includes: a user similarity measurement module 306 configured to compare a user of the social message with a user of each representative message to obtain a user similarity between the social message and each representative message.

The similarity acquisition module 302 includes: a theme similarity measurement unit 302-1 configured to calculate a relative entropy between the theme probability vector of the social message and the theme probability vector of each representative message to obtain a theme message similarity between the social message and each representative message, and a similarity acquisition unit 302-2 configured to perform weighted summation on the theme message similarity obtained by the theme similarity acquisition unit 302-1 and the user similarity obtained by the user similarity measurement module 306, to obtain the similarity between the social message and each representative message.

Figure 8:
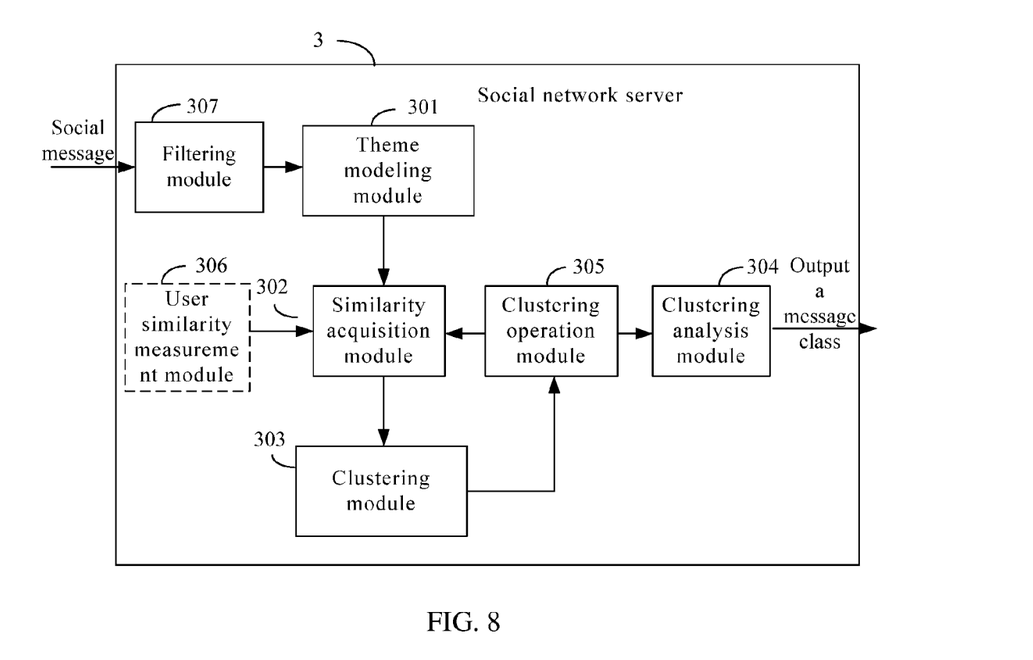
FIG. 8 is a schematic structural diagram of a social network server according to still another embodiment of the present disclosure.

Optionally, referring to FIG. 8, the social network server 3 further includes: a filtering module 307 configured to acquire a field to which the social message belongs, and if the field to which the social message belongs is not a preset field, remove the social message to obtain a filtered social message. The social network server may perform the theme modeling analysis on the social message that is after the filtering, to obtain the theme probability vector of the social message.

For example, the preset field includes: politics, social hotspots, disaster, and finance. If a field to which a received social message belongs is entertainment, the social message is filtered out.

In the foregoing embodiment, a social network server receives a social message, and saves, according to a similarity between the social message and each representative message, the social message in a message class that contains a representative message most similar to the social message, and outputs the message class to a social network client when a quantity of social messages in the message class reaches a first threshold or themes of the social messages in the message class are consistent. The social network server can actively output the message class to the social network client, thereby implementing real-time social message monitoring, so that the social network client can actively discover clustered social events.

Figure 9:
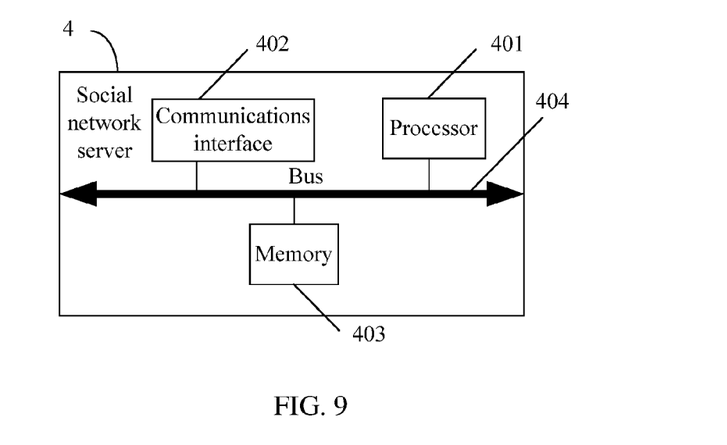
FIG. 9 is a schematic structural diagram of a social network server according to yet another embodiment of the present disclosure.

An embodiment of the present disclosure provides a social network server 4 configured to monitor a social message, and referring to FIG. 9, the server includes: a processor 401, a communications interface 402, a memory 403, and a bus 404, where the processor 401, the communications interface 402, and the memory 403 are connected using the bus 404, and the memory 403 is configured to save data processed by the processor 401.

The bus 404 may be an industry standard architecture (ISA) bus, a peripheral component interconnect (PCI) bus, or an extended industry standard architecture (EISA) bus, or the like. The bus 404 may be classified into an address bus, a data bus, a control bus, and the like. For ease of presentation, the bus 404 in FIG. 9 is represented by merely a thick line, but it does not indicate that there is merely one bus or one type of bus.

The memory 403 is configured to save executable program code, where the program code includes a computer operation instruction. The memory 403 may include a high-speed random access memory (RAM), and may further include a non-volatile memory, for example, at least one magnetic disk memory.

The processor 401 may be a central processing unit (CPU) or an application-specific integrated circuit (ASIC), or may be configured as one or multiple integrated circuits implementing the embodiment of the present disclosure.

The processor 401 is configured to receive a social message using the communications interface 402, and perform theme modeling analysis on the social message to obtain a theme probability vector of the social message.

The processor 401 is further configured to receive the social message using the communications interface 402, and acquire a content parameter of the social message, a temporal parameter of the social message, and a spatial parameter of the social message.

The processor 401 is configured to perform the theme modeling analysis on the content parameter of the social message, the temporal parameter of the social message, and the spatial parameter of the social message using a LDA algorithm, to obtain the theme probability vector of the social message.

The processor 401 is further configured to compare the theme probability vector of the social message with a theme probability vector of each representative message to obtain a theme similarity, and acquire a similarity between the social message and each representative message according to the theme similarity.

The representative message is a representative social message in a message class.

After the theme similarity is obtained, a more precise similarity between the social message and each representative message may be further obtained with reference to another similarity parameter.

Optionally, the processor 401 is further configured to compare a user of the social message with a user of each representative message to obtain a user similarity between the social message and each representative message.

Further, the processor 401 is configured to calculate a relative entropy between the theme probability vector of the social message and the theme probability vector of each representative message to obtain a theme message similarity between the social message and each representative message.

The processor 401 is configured to perform weighted summation on the theme message similarity and the user similarity to obtain the similarity between the social message and each representative message.

The processor 401 is further configured to select a representative message from each message class.

Furthermore, the following provides four selecting manners:

A social message within a preset period of time is selected from each message class as the representative message, where preset periods of time in different message classes may be different.

Alternatively, a social message within a preset place is selected from each message class as the representative message, where preset places in different message classes may be different.

Alternatively, a social message within a preset period of time and within a preset place is selected from each message class as the representative message, where preset periods of time and preset places in different message classes may be different.

Alternatively, weighted averaging is performed on theme probability vectors of all social messages in each message class to obtain a theme probability vector of a representative message of each message class, and a social message matching the theme probability vector of the representative message of each message class is selected from the message class as the representative message, where if a new social message is added to the message class, the weighted averaging is performed again to calculate the theme probability vector of the representative message of the message class. A weight of the weighted averaging may be determined according to time, space, and a quantity of users, for example, a more recently uploaded social message has a larger weight, a social message closer to a place of occurrence has a larger weight, and a social message with a larger user quantity (including a quantity of uploading users, a quantity of forwarding users, and a quantity of following users) has a larger weight.

The processor 401 is further configured to output the message class to a social network client using the communications interface 402 when a quantity of social messages in the message class reaches a first threshold or themes of social messages in the message class are consistent.

When a quantity of social messages in any message class reaches a first threshold, it indicates that the quantity of social messages in the message class is sufficient, and a first condition of outputting is met.

Alternatively, in similarities between all the social messages in the message class, when a quantity of similarities, which are greater than a preset second similarity threshold, between the social messages reaches a second threshold, a condition of theme consistency is met, and the message class is output. The second threshold may also be a proportion, that is, when the quantity of similarities, which are greater than the preset second similarity threshold, between the social messages reaches a certain proportion of a total quantity, the theme consistency is met.

Optionally, the processor 401 is further configured to perform a search, insert, or delete operation on a social message in any message class saved in the memory 403.

An operator may perform a search, insert, or delete operation on a social message saved in the social network server. In this way, a method for manually inputting and outputting a social message or deleting a social message is provided, resulting in more flexible social message monitoring.

Furthermore, an input instruction (a search, insert, or delete instruction) is received, a response is made to the instruction, and the search, insert, or delete operation is performed on the social message in a corresponding message class. If the input instruction is the search instruction, a corresponding social message is output; if the input instruction is the insert instruction, a social message is inserted into a corresponding message class, and if the input instruction is the delete instruction, a corresponding message class is deleted or a social message specified by the instruction is deleted from a corresponding message class.

Optionally, the processor 401 is further configured to: acquire a field to which the social message belongs, and if the field to which the social message belongs is not a preset field, remove the social message to obtain a filtered social message, where the social network server may perform the theme modeling analysis on the filtered social message to obtain the theme probability vector of the social message.

For example, the preset field includes: politics, social hotspots, disaster, and finance. If a field to which a received social message belongs is entertainment, the social message is filtered out.

In the foregoing social network server, a social message is received, and according to a similarity between the social message and each representative message, the social message is saved in a message class that contains a representative message most similar to the social message, and the message class is output to a social network client when a quantity of social messages in the message class reaches a first threshold or themes of the social messages in the message class are consistent. The social network server can actively output the message class to the social network client, thereby implementing real-time social message monitoring, so that the social network client can actively discover clustered social events.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A social message monitoring method, comprising:
   receiving a social message;
   performing theme modeling analysis on the social message to obtain a theme probability vector of the social message;
   comparing the theme probability vector of the social message with a theme probability vector of a representative message to obtain a theme similarity;
   comparing a user of the social message with a user of each representative message to obtain a user similarity between the social message and each representative message;
   acquiring a similarity between the social message and the representative message according to the theme similarity, the representative message being a representative social message in a message class;
   saving the social message in a message class containing a representative message most similar to the social message, the representative message from each message class being selected by performing weighted averaging on theme probability vectors of all social messages in each message class to obtain a theme probability vector of a representative message of each message class, and when a new social message is added to the message class, selecting, from each message class, a social message matching the theme probability vector of the representative message of the message class as the representative message, and performing weighted averaging again to calculate the theme probability vector of the representative message of the message class; and
   outputting the message class to a social network client when a quantity of social messages in the message class reaches a first threshold or themes of social messages in the message class are consistent.

2. The method of claim 1, further comprising:
   creating a new message class when the similarity between the social message and each of the representative message is not greater than a preset first similarity threshold; and
   saving the social message in the new message class when the similarity between the social message and each of the representative message is not greater than the preset first similarity threshold.

3. The method of claim 1, wherein receiving the social message, and performing the theme modeling analysis on the social message to obtain the theme probability vector of the social message comprises:
   receiving the social message;
   acquiring a content parameter of the social message, a temporal parameter of the social message, and a spatial parameter of the social message; and
   performing the theme modeling analysis on the content parameter of the social message, the temporal parameter of the social message, and the spatial parameter of the social message using a latent Dirichlet allocation (LDA) algorithm, to obtain the theme probability vector of the social message.

4. The method of claim 2, wherein receiving the social message, and performing the theme modeling analysis on the social message to obtain the theme probability vector of the social message comprises:
   receiving the social message;
   acquiring a content parameter of the social message, a temporal parameter of the social message, and a spatial parameter of the social message; and
   performing the theme modeling analysis on the content parameter of the social message, the temporal parameter of the social message, and the spatial parameter of the social message using a latent Dirichlet allocation (LDA) algorithm, to obtain the theme probability vector of the social message.

5. The method of claim 1, further comprising:
   comparing the theme probability vector of the social message with a theme probability vector of each representative message to obtain a theme similarity, and
   the similarity between the social message and each representative message being acquired according to the theme similarity by:

calculating a relative entropy between the theme probability vector of the social message and the theme probability vector of each representative message to obtain a theme message similarity between the social message and each representative message; and performing weighted summation on the theme message similarity and the user similarity to obtain the similarity between the social message and each representative message.

6. The method of claim 1, further comprising performing a search, insert, or delete operation on a social message in any message class.

7. The method of claim 1, wherein before performing the theme modeling analysis on the social message to obtain the theme probability vector of the social message, the method further comprises:

acquiring a field to which the social message belongs; and removing the social message to obtain a filtered social message when the field to which the social message belongs is not a preset field, and the theme modeling analysis on the social message is performed to obtain a theme probability vector of the social message by performing the theme modeling analysis on the filtered social message to obtain the theme probability vector of the social message.

8. The method of claim 2, wherein before performing the theme modeling analysis on the social message to obtain the theme probability vector of the social message, the method further comprises:

acquiring a field to which the social message belongs; and removing the social message to obtain a filtered social message when the field to which the social message belongs is not a preset field, and the theme modeling analysis on the social message is performed to obtain a theme probability vector of the social message by performing the theme modeling analysis on the filtered social message to obtain the theme probability vector of the social message.

9. A social network server configured to monitor a social message, comprising:

a memory comprising instructions; and a processor coupled to the memory and configured to execute the instructions to:

receive a social message using a communications interface;

perform theme modeling analysis on the social message to obtain a theme probability vector of the social message;

compare the theme probability vector of the social message with the theme probability vector of a representative message to obtain a theme similarity;

compare a user of the social message with a user of each representative message to obtain a user similarity between the social message and each representative message;

acquire a similarity between the social message and the representative message according to the theme similarity, the representative message being a representative social message in a message class;

save the social message in a message class that contains a representative message most similar to the social message, the similarity being obtained by measurement, the representative message from each message class being selected by performing weighted averaging on theme probability vectors of all social messages in each message class to obtain a theme probability vector of a representative message of each message class, and when a new social message is added to the message class, selecting, from each message class, a social message matching the theme probability vector of the representative message of the message class as the representative message, and performing weighted averaging again to calculate the theme probability vector of the representative message of the message class; and output the message class to a social network client when a quantity of social messages in the message class reaches a first threshold or themes of social messages in the message class are consistent.

10. The social network server of claim 9, wherein the processor is further configured to:

create a new message class when the similarity between the social message and each of the representative messages is not greater than a preset first similarity threshold; and save the social message in the new message class when the similarity between the social message and each of the representative messages is not greater than the preset first similarity threshold.

11. The social network server of claim 9, wherein the processor is further configured to:

receive the social message;

acquire a content parameter of the social message, a temporal parameter of the social message, and a spatial parameter of the social message; and perform the theme modeling analysis on the content parameter of the social message, the temporal parameter of the social message, and the spatial parameter of the social message using a latent Dirichlet allocation (LDA) algorithm, to obtain the theme probability vector of the social message.

12. The social network server of claim 10, wherein the processor is further configured to:

receive the social message;

acquire a content parameter of the social message, a temporal parameter of the social message, and a spatial parameter of the social message; and perform the theme modeling analysis on the content parameter of the social message, the temporal parameter of the social message, and the spatial parameter of the social message using a latent Dirichiet allocation (LDA) algorithm, to obtain the theme probability vector of the social message.

13. The social network server of claim 9, wherein the processor is further configured to:

calculate a relative entropy between the theme probability vector of the social message and the theme probability vector of each representative message to obtain a theme message similarity between the social message and each representative message; and perform weighted summation on the theme message similarity and the user similarity, to obtain the similarity between the social message and each representative message.

14. The social network server of claim 9, wherein the processor is further configured to perform a search, insert, or delete operation on a social message in any message class.

15. The social network server of claim 9, wherein the processor is further configured to:

acquire a field to which the social message belongs;

remove the social Message to obtain a filtered social message when the field to which the social message belongs is not a preset field; and perform the theme modeling analysis on the filtered social message to obtain the theme probability vector of the social message.

16. The social network server of claim 10, wherein the processor is further configured to;

acquire a field to which the social message belongs;

remove the social message to obtain a filtered social message when the field to which the social message belongs is not a preset field; and perform the theme modeling analysis on the filtered social message to obtain the theme probability vector of the social message.

\* \* \* \* \*

UNITED STATES PATENT AND TRADEMARK OFFICE
CERTIFICATE OF CORRECTION

PATENT NO. : 10,250,550 B2
APPLICATION NO. : 15/147684
DATED : April 2, 2019
INVENTOR(S) : Lei Chen, Xiangmin Zhou and Xiuqiang He It is certified that error appears in the above-identified patent and that said Letters Patent is hereby corrected as shown below:

On the Title Page

Item (30), Line 1: "201410175434" should read "201410175434.5"

In the Claims

Column 18, Line 64: "Message" should read "message"

Signed and Sealed this
Eighteenth Day of June, 2019

Andrei Iancu
*Director of the United States Patent and Trademark Office*